United States Patent
Jeong

(10) Patent No.: US 7,728,531 B2
(45) Date of Patent: Jun. 1, 2010

(54) LAMP DRIVING CIRCUIT, INVERTER BOARD AND DISPLAY APPARATUS HAVING THE SAME

(75) Inventor: Young-Cheol Jeong, Cheonan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 3 days.

(21) Appl. No.: 12/069,878

(22) Filed: Feb. 12, 2008

(65) Prior Publication Data

US 2008/0191634 A1    Aug. 14, 2008

(30) Foreign Application Priority Data

Feb. 13, 2007    (KR)   ................ 10-2007-0015004

(51) Int. Cl.
*H05B 37/02*    (2006.01)

(52) U.S. Cl. ............... 315/291; 315/307; 315/209 R

(58) Field of Classification Search ............ 315/209 R, 315/224–225, 247, 291, 307–308, DIG. 5, 315/DIG. 7

See application file for complete search history.

(56) References Cited

U.S. PATENT DOCUMENTS

| | | | | |
|---|---|---|---|---|
| 5,416,387 A | * | 5/1995 | Cuk et al. | ............... 315/209 R |
| 5,877,595 A | * | 3/1999 | Nerone | ............... 315/209 R |
| 6,977,472 B2 | * | 12/2005 | Matsubayashi et al. | ..... 315/291 |
| 2002/0030456 A1 | * | 3/2002 | Kim | ............... 315/307 |
| 2007/0040517 A1 | * | 2/2007 | Yu | ............... 315/291 |
| 2007/0096662 A1 | * | 5/2007 | Ribarich et al. | ............ 315/224 |
| 2008/0136343 A1 | * | 6/2008 | Yu et al. | ...................... 315/219 |

FOREIGN PATENT DOCUMENTS

| | | |
|---|---|---|
| JP | 5-165424 | 7/1993 |
| JP | 11-97196 | 4/1999 |
| JP | 2000-241796 | 9/2000 |
| KR | 2003-0027024 | 4/2003 |

OTHER PUBLICATIONS

Patent Abstracts of Japan, Publication No. 05-165424, Jul. 2, 1993, 1 p.
Patent Abstracts of Japan, Publication No. 11-097196, Apr. 9, 1999, 1 p.
Patent Abstracts of Japan, Publication No. 2000-241796, Sep. 8, 2000, 1 p.
English Language Abstract (International Publication No. WO 02/103665), Korean Publication No. 2003-0027024, Apr. 3, 2003.

* cited by examiner

*Primary Examiner*—David Hung Vu
*Assistant Examiner*—Tung X Le
(74) *Attorney, Agent, or Firm*—Innovation Counsel LLP

(57) ABSTRACT

A lamp driving circuit, an inverter board and a display apparatus having the inverter board, the lamp driving circuit receiving a direct current voltage and provides the direct current voltage to a square wave generator, and the square wave generator outputting a first square wave voltage having a duty ratio corresponding to a voltage level of the direct current voltage. An inverter controller compares the first square wave voltage with a reference voltage and outputs a second square wave voltage. An inverter provides an output of a lamp driving voltage according to the duty ratio of the second square wave voltage.

10 Claims, 6 Drawing Sheets

LAMP DRIVING CIRCUIT, INVERTER BOARD AND DISPLAY APPARATUS HAVING THE SAME

CROSS-REFERENCE TO RELATED APPLICATION

This application relies for priority upon Korean Patent Application No. 10-2007-15004 filed on Feb. 13, 2007, the contents of which are herein incorporated by reference in its entirety.

BACKGROUND OF THE INVENTION

1. Field of the Invention

The present invention relates to a lamp driving circuit, an inverter board and a display apparatus having the inverter board. More particularly, the present invention relates to a lamp driving circuit, an inverter board and a display apparatus having the inverter board, capable of preventing a flickering phenomenon of a light from a lamp.

2. Description of the Related Art

In general, a liquid crystal display (LCD) includes a liquid crystal display panel displaying images and a backlight providing the liquid crystal display panel with light. Some backlights employ a cold cathode fluorescent lamp (CCFL) as a light source.

Recently, LCDs have utilized a dimming method to control brightness of the backlight thereof in order to increase a contrast ratio of the images displayed thereon or to decrease electric power consumption of the backlight. Dimming methods for the backlight include (i) a pulse width modulation (PWM) control method and (ii) tube current control.

In the PWM control method, the CCFL is repeatedly turned on and turned off in accordance with a duty ratio of the PWM signal. That is, the PWM control method controls turn-on and turn-off periods of the CCFL to adjust the brightness of the backlight. The tube current control method controls a voltage level applied to the CCFL to vary the tube current of the CCFL, thereby adjusting the brightness of the backlight. However, since the tube current control does not work when the tube current is low, the PWM control method has been mainly used for the LCD instead of the tube current control method.

In order to employ the PWM control method, a lamp driving circuit for a backlight receives a direct current voltage or a square wave voltage from an external device. In case of receiving the direct current voltage, the lamp driving circuit compares the direct current voltage with a triangle wave voltage that is self-generated in order to generate the square wave voltage. However, noise occurs between the triangle wave voltage and the direct current voltage, so that the square wave voltage is distorted. When the turn-on and turn-off of the lamp is controlled based on the distorted square wave voltage, the flickering phenomenon occurs on a screen of the display device that employs the lamp driving circuit.

SUMMARY OF THE INVENTION

The present invention provides a lamp driving circuit capable of preventing a flickering phenomenon of a lamp.

The present invention also provides an inverter board on which the lamp driving circuit is mounted.

The present invention also provides a display apparatus having the inverter board.

In one aspect of the present invention, a lamp driving circuit includes a square wave generator, an inverter controller and an inverter. The square wave generator receives a direct current voltage from an external device and outputs a first square wave voltage having a duty ratio corresponding to a voltage level of the direct current voltage. The inverter controller compares the first square wave voltage with a predetermined reference voltage and outputs a second square wave voltage based on the compared result. The inverter outputs a lamp driving voltage that drives a lamp in response to the second square wave voltage.

In another aspect of the present invention, an inverter board includes a main connecter, a square wave generator, an inverter controller, an inverter, a lamp connecter and a base board.

The main connecter receives a direct current voltage from an external device, and the square wave generator receives the direct current voltage from the main connecter to output a first square wave voltage having a duty ratio corresponding to a voltage level of the direct current voltage. The inverter controller compares the first square wave voltage with a predetermined reference voltage and outputs a second square wave voltage based on the compared result. The inverter outputs a lamp driving voltage that drives a lamp in response to the second square wave voltage. The lamp connecter is electrically connected to the lamp to apply the lamp driving voltage to the lamp. The main connecter, the square wave generator, the inverter controller, the inverter, and the lamp connecter are mounted on the base board.

In another aspect of the present invention, a display apparatus includes a square wave generator, an inverter controller, an inverter, a backlight assembly and a display panel.

The square wave generator receives a direct current voltage from an external device and outputs a first square wave voltage having a duty ratio corresponding to a voltage level of the direct current voltage. The inverter controller compares the first square wave voltage with a predetermined reference voltage and outputs a second square wave voltage based on the compared result. The inverter outputs a lamp driving voltage in response to the second square wave voltage. The backlight assembly includes a lamp to generate a light in response to the lamp driving voltage. The display panel displays an image using the light.

According to the above, the direct current voltage from an external device is converted to the first square wave voltage having less noise, and the first square wave voltage is compared with a reference voltage to generate the second square wave voltage. Since turn-on and turn-off of the lamp are controlled based on the duty ratio of the second square wave voltage, a flickering phenomenon caused by the noise may be prevented.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Figure 1:
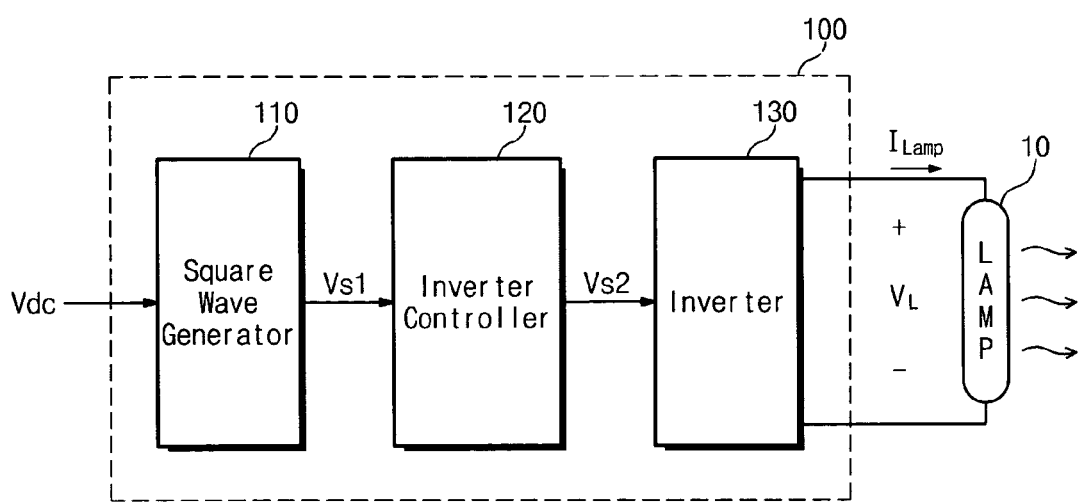
FIG. 1 is a block diagram showing an exemplary embodiment of a lamp driving circuit according to the present invention.

Hereinafter, the present invention is explained in detail with reference to the accompanying drawings. In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

FIG. 1 is a block diagram showing an exemplary embodiment of a lamp driving circuit according to the present invention.

Referring to FIG. 1, a lamp driving circuit 100 includes a square wave generator 110, an inverter controller 120 and an inverter 130.

The square wave generator 110 receives a direct current voltage Vdc from an external device and generates a first square wave voltage Vs1 having a duty ratio which is a function of the magnitude of the direct current voltage Vdc. In the present embodiment, the direct current voltage Vdc has a voltage level within a range of about 0 to about 3.3 volts. As will be appreciated by reference to FIG. 4, the first square wave voltage Vs1 has a duty ratio that increases according to the increase of the voltage level of the direct current voltage Vdc. The inverter controller 120 receives the first square wave voltage Vs1 from the square wave generator 110 and compares the first square wave voltage Vs1 with a predetermined reference voltage and generates a second square wave voltage Vs2.

The second square wave voltage Vs2 may have a same phase and a same duty ratio as those of the first square wave voltage Vs1. The phase and the duty ratio of the second square wave voltage Vs2 will be described in detail with reference to FIG. 4.

As above-described, the inverter controller 120 controls the duty ratio of the second square wave voltage Vs2 which is supplied to the inverter 130, thereby performing a dimming operation of a lamp 10, which adjusts a turn-on period of the lamp 10.

The inverter 130 receives the second square wave voltage Vs2 output from the inverter controller 120 and converts the second square wave voltage Vs2 to a lamp driving voltage $V_L$ for the lamp 10. The inverter 130 is electrically connected to both ends of the lamp 10 that generates a light, and the inverter 130 applies the lamp driving voltage $V_L$ to the lamp 10. In the present exemplary embodiment, the lamp 10 includes a cold cathode fluorescent lamp.

The lamp 10 generates the light in response to the lamp driving voltage $V_L$ provided from the inverter 130. The turn-on period of the lamp 10 is determined by the duty ratio of the second square wave voltage Vs2. A relation between the turn-on period of the lamp 10 and the second square wave voltage Vs2 is described below with reference to FIG. 4.

Figure 2:
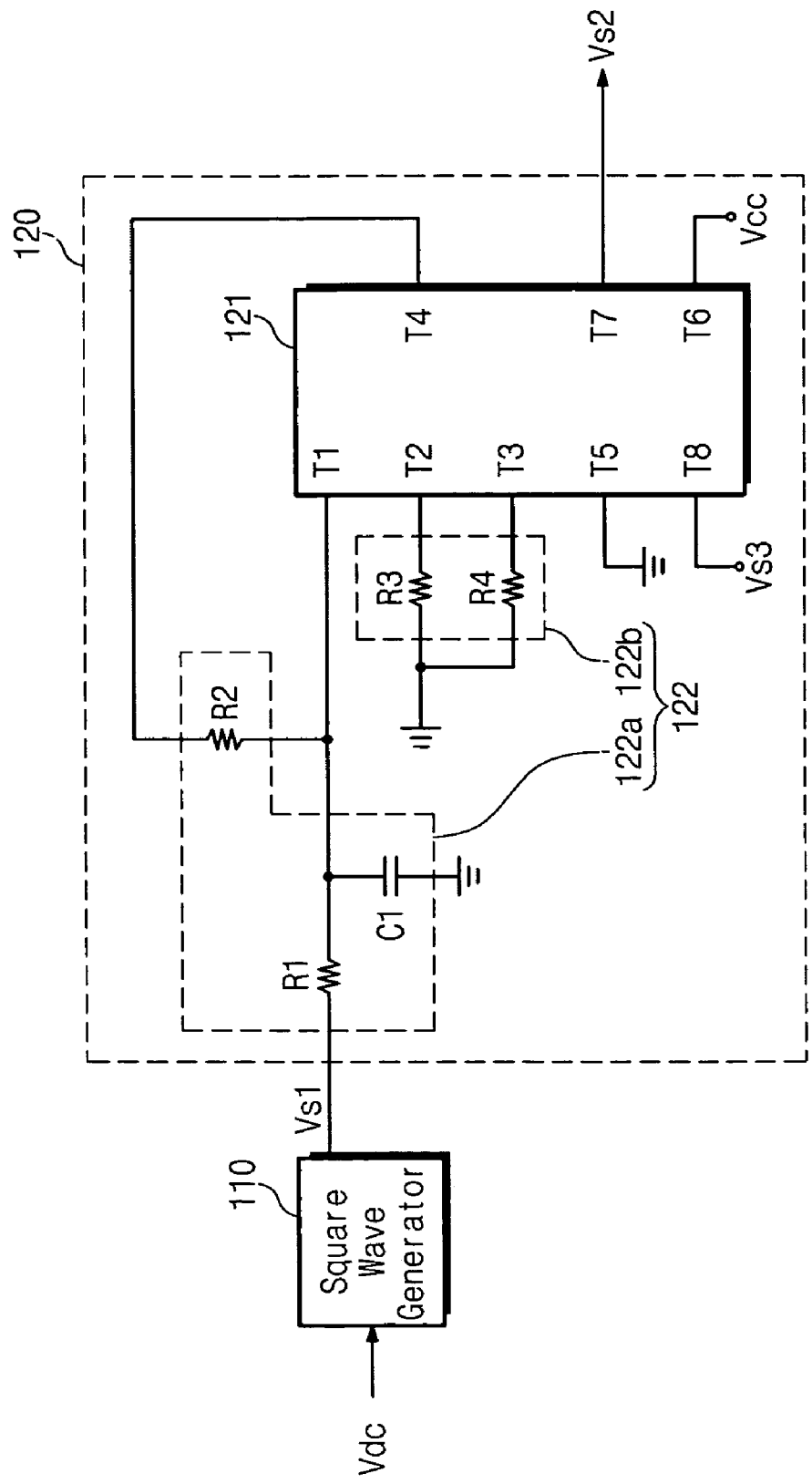
FIG. 2 is a circuit diagram showing a square wave generator and an inverter controller shown in FIG. 1.
Figure 3:
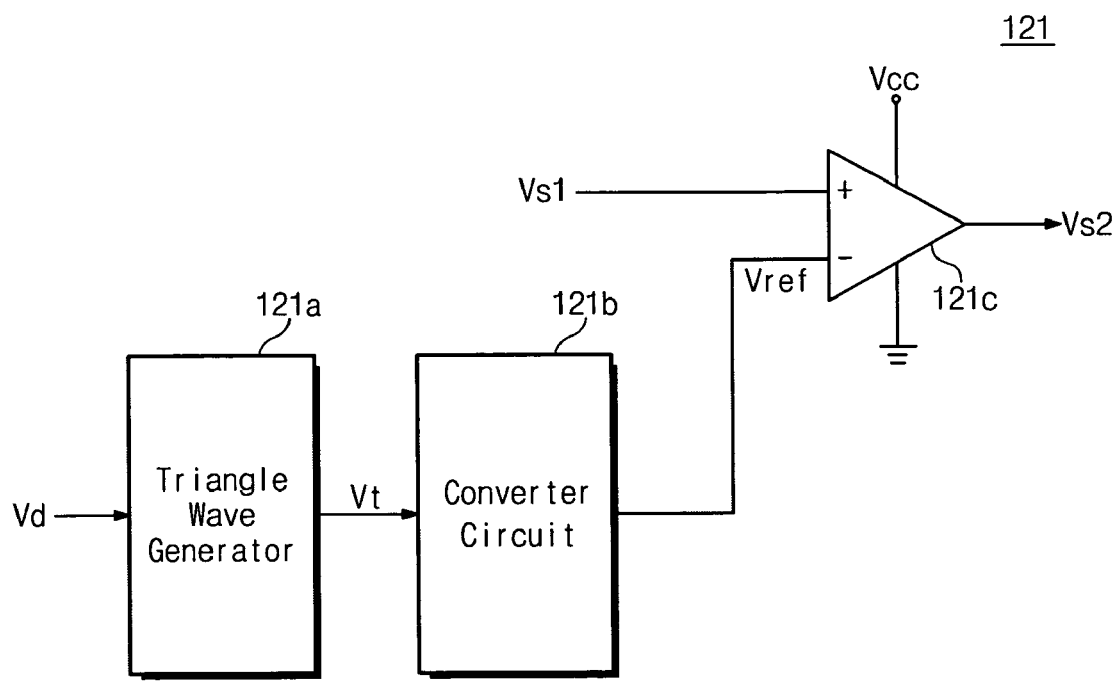
FIG. 3 is a block diagram showing the inverter controller 120 of FIG. 2.

FIG. 2 is a circuit diagram showing the square wave generator 110 and inverter controller 120 shown in FIG. 1. FIG. 3 is a block diagram showing main chip 121 of inverter controller 120 shown in FIG. 2.

Referring to FIG. 2, the inverter controller 120 includes a main chip 121 and a sub-circuit 122 connected to the main chip 121.

The sub-circuit 122 includes an R/C delay circuit 122a and a converting circuit 122b. The R/C delay circuit 122a includes a first capacitor C1 and a first resistance R1, and a second resistance R2 which are connected in parallel to the first capacitor C1. The R/C delay circuit 122a delays the first square wave voltage Vs1 output from the square wave generator 110 by a predetermined period and applies the first square wave voltage Vs1 to a first terminal T1 of the main chip 121.

The converting circuit 122b includes a third resistance R3 connected between a second terminal T2 of the main chip 121 and a ground, and a fourth resistance R4 connected between a third terminal T3 of the main chip 121 and the ground. The converting circuit 122b is connected to an inner circuit (not shown) arranged in the main chip 121 to convert a triangle wave voltage that is self-generated by the main chip 121 to a reference voltage having a direct current The main chip 121 further includes a fourth terminal T4 connected to the second resistance R2, a fifth terminal T5 connected to the ground, a sixth terminal T6 receiving a driving voltage VCC from an external circuit, a seventh terminal T7 outputting the second square wave voltage Vs2 and an eighth terminal T8 receiving a third square wave voltage Vs3 which is generated by the external device When the direct current voltage Vdc is applied to the square wave generator 110 from the external device, the external device does not apply the third square wave voltage Vs3 to the eighth terminal T8 of the main chip 121. However, when the third square wave voltage Vs3 is applied to the eighth terminal T8 from the external device, the direct current voltage Vdc is not applied to the square wave generator 110.

That is, the lamp driving circuit 100 may selectively receive either the direct current voltage Vdc or the third square wave voltage Vs3 from the external device in order to perform the dimming operation. When the lamp driving circuit 100 receives the direct current voltage Vdc, the direct current voltage Vdc is converted to the first square wave voltage Vs1 through the square wave generator 110 and the first square wave voltage Vs1 is provided to the inverter controller 120. When the lamp driving circuit 100 receives the third square wave voltage Vs3, the third square wave voltage Vs3 is directly applied to the inverter controller 120 without the above-mentioned conversion process.

Referring to FIG. 3, the main chip 121 includes a triangle wave generator 121a, a converter 121b and a comparator 121c.

The triangle wave generator 121a receives a driving voltage Vd from an external circuit to generate a triangle wave voltage Vt that swings within a range of a predetermined voltage. In the present exemplary embodiment, the triangle wave voltage Vt swings between about 0.5 volts to about 20 volts. The triangle wave voltage Vt is used as a reference voltage, so that the triangle wave voltage Vt has a fixed voltage level that is not changeable by external conditions.

The triangle wave voltage Vt output from the triangle wave generator 121a is applied to the converter 121b. The converter 121b and the converting circuit 122b (shown in FIG. 2), which is arranged in a peripheral area of the main chip 121 and electrically connected to the converter 121b, convert the triangle wave voltage Vt to a reference voltage Vref having a predetermined voltage level. The converting circuit 122b is designed to allow the reference voltage Vref to have a voltage level within a swing range of the first square wave voltage Vs1. In the present exemplary embodiment, a voltage level of the reference voltage Vref may be controlled according to sizes of the third and the fourth resistances R3 and R4 included in the converting circuit 122b.

The comparator 121c includes an operational amplifier that receives the first square wave voltage Vs1 output from the square wave generator 110 and the reference voltage Vref output from the converter 121b to compare the first square wave voltage Vs1 with the reference voltage Vref. The comparator 121c compares the first square wave voltage Vs1 with the reference voltage Vref in response to a driving voltage Vcc applied to the sixth terminal T6 (shown in FIG. 2) of the main chip 121 and outputs the second square wave voltage Vs2 based on the compared result.

In the present exemplary embodiment, the comparator 121c outputs the second square wave voltage Vs2 having a high level during a period where the first square wave voltage Vs1 is larger than the reference voltage Vref and having a low level during a period where the first square wave voltage Vs1 is smaller than the reference voltage Vref. Thus, the second square wave voltage Vs2 output from the comparator 121c may have a same duty ratio as that of the first square wave voltage Vs1.

As described above, the second square wave voltage Vs2 output from the comparator 121c is provided to the inverter 130 as shown in FIG. 1.

Figure 4:
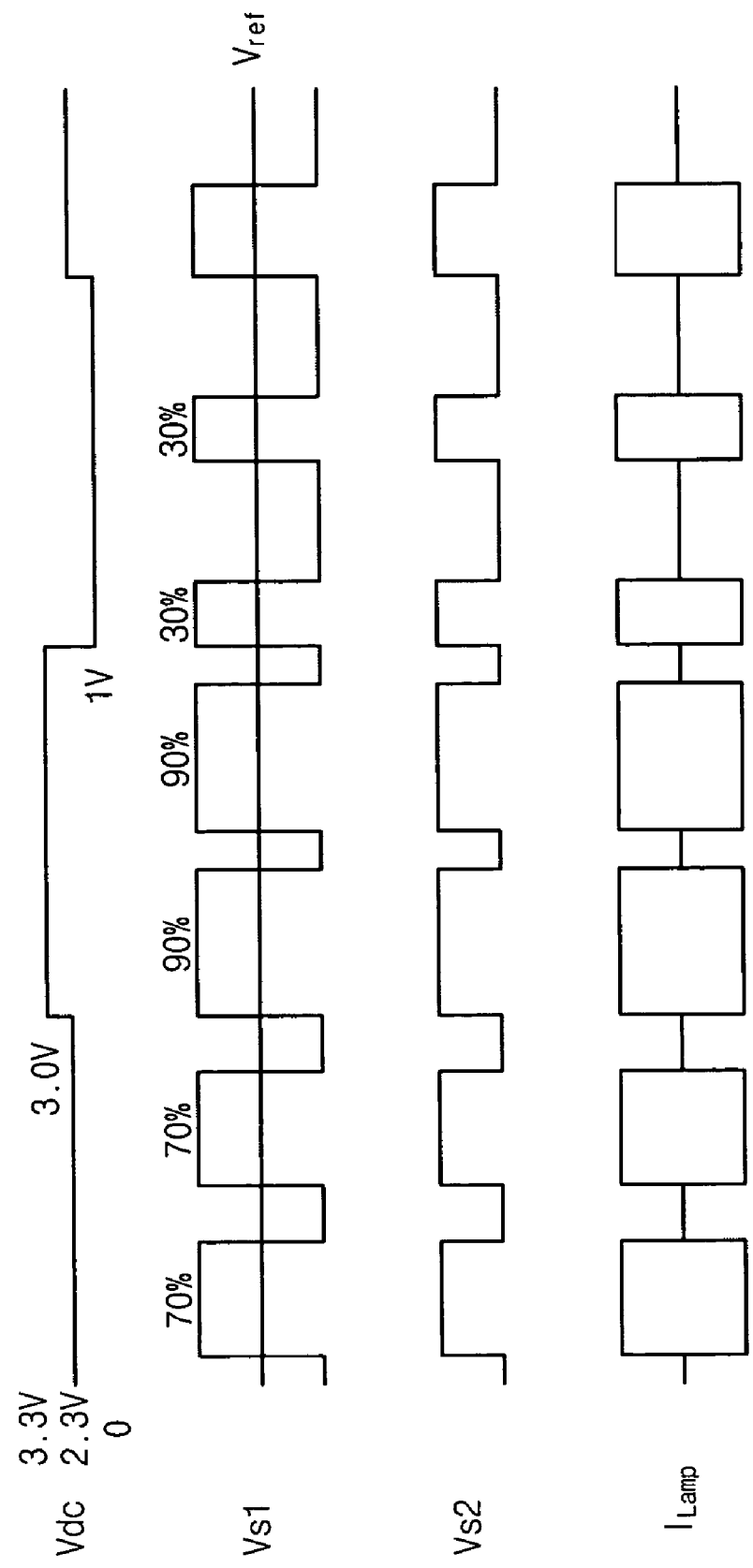
FIG. 4 is an input and output waveform diagram of the lamp driving circuit shown in FIG. 1.

FIG. 4 is an input and output waveform diagram of the lamp driving circuit shown in FIG. 1.

Referring to FIG. 4, the lamp driving circuit 100 (shown in FIG. 1) receives the direct current voltage Vdc from the external device, and the direct current voltage Vdc has a voltage level in a range of about 0 to about 3.3 volts. The external device (not shown) controls the voltage level of the direct current voltage Vdc in order to control the turn-on period of the lamp 10 (shown in FIG. 1), and then provides the direct current voltage Vdc to the lamp driving circuit 100.

The duty ratio of the first square wave voltage Vs1 generated by the square wave generator 110 (shown in FIG. 1) is determined according to the voltage level of the direct current voltage Vdc. Particularly, when the voltage level of the direct current voltage Vdc is about 2.3 volts, the duty ratio of the first square wave voltage Vs1 is determined as about 70%, and when the voltage level of the direct current voltage Vdc is about 3.0 volts, the duty ratio of the first square wave voltage Vs1 increases to about 90%. When the voltage level of the direct current voltage Vdc decreases to about 1 volt, the duty ratio of the first square wave voltage Vs1 decreases to about 30%.

The first square wave voltage Vs1 is provided to the inverter controller 120 (shown in FIG. 1) and compared with the reference voltage Vref that is predetermined in the inverter controller 120. The reference voltage Vref is predetermined to have the voltage level within the swing range of the first square wave voltage Vs1.

The inverter controller 120 outputs the second square wave voltage Vs2 having a high level when the first square wave voltage Vs1 is larger than the reference voltage Vref and having a low level when the first square wave voltage Vs1 is smaller than the reference voltage Vref. Thus, the second square wave voltage Vs2 has the duty ratio same as that of the first square wave voltage Vs1.

When the second square wave voltage Vs2 is applied to the inverter 130 (shown in FIG. 1), the inverter 130 applies the lamp driving voltage $V_L$ (shown in FIG. 1) to the lamp 10 (shown in FIG. 1) during a high period of the second square wave voltage Vs2 to turn on the lamp 10, and the inverter 130 does not apply the lamp driving voltage $V_L$ to the lamp 10 during a low period of the second square wave voltage Vs2 to turn off the lamp 10.

As shown in FIG. 4, a tube current I lamp of the lamp 10 is differed according to the duty ratio of the second square wave voltage Vs2, so that the lamp driving circuit 100 may performs the dimming operation for the lamp 10.

Consequently, when the direct current voltage Vdc is applied to the lamp driving circuit 100 from the external device, the lamp driving circuit 100 converts the direct current voltage Vdc to the first square wave voltage Vs1, compares the first square wave voltage Vs1 with the reference voltage Vref, generates the second square wave voltage Vs2, and applies the second square wave voltage Vs2 to the inverter 130. As a result, the lamp driving circuit 100 may perform the dimming operation for the lamp 10.

That is, since the second square wave voltage Vs2 is generated based on the compared result between the first square wave voltage Vs1 and the reference voltage Vref and a noise between the first square wave voltage Vs1 and the reference voltage Vref is relatively weakened, a distortion of the second square wave voltage Vs2 may be decreased. Thus, the lamp driving circuit 100 may prevent a flickering phenomenon of the lamp 10 due to the distortion of the second square wave voltage Vs2.

Figure 5:
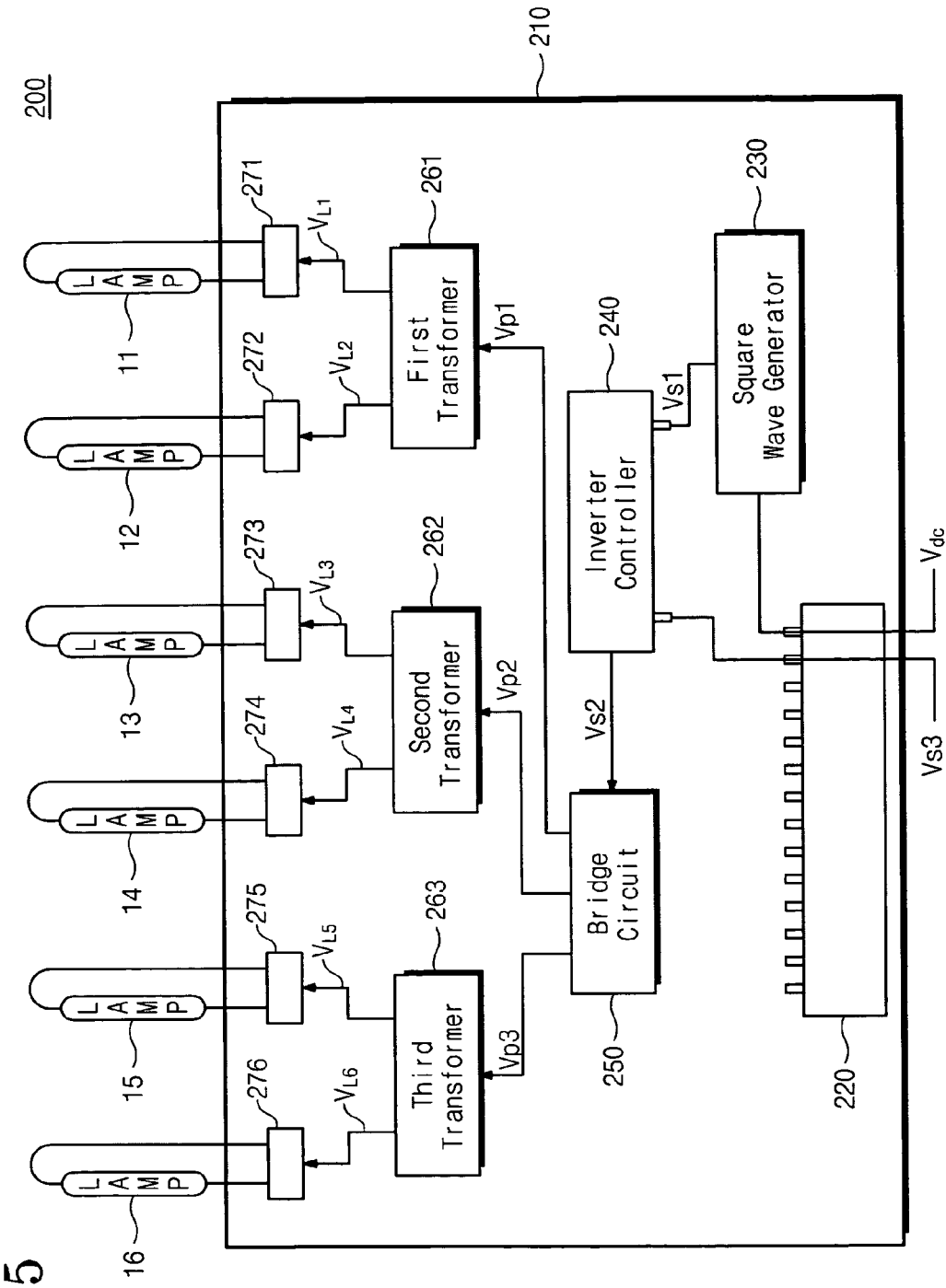
FIG. 5 is a block diagram showing an inverter board which includes a lamp driving circuit according to an embodiment of the present invention.

FIG. 5 is a block diagram showing inverter board 200 according to an embodiment of the present invention. In FIG. 5, the same reference numerals and the same reference names denote the same signals in FIG. 1, and thus the detailed descriptions of the same signals will be omitted.

Referring to FIG. 5, an inverter board 200 includes a base board 210, a main connecter 220, a square wave generator 230, an inverter controller 240, a bridge circuit 250, a first transformer 261, a second transformer 262, a third transformer 263, a first lamp connecter 271, a second lamp connecter 272, a third lamp connecter 273, a fourth lamp connecter 274, a fifth lamp connecter 275, and a sixth lamp connecter 276.

The main connecter 220 is arranged adjacent to one end of the base board 210. The main connecter 220 receives a driving direct current voltage, a ground voltage and a shut-down protect signal and further receives either a direct current voltage Vdc or a third square wave voltage Vs3 from an external device in order to perform the dimming operation.

When the direct current voltage Vdc is applied to the main connecter 220 from the external device, the direct current voltage Vdc is output from a first output pin of the main connecter 220, and when the third square wave voltage Vs3 is applied to the main connecter 220, the third square wave voltage Vs3 is output from a second output pin of the main connecter 220.

The square wave generator 230 and the inverter controller 240 that is prepared in a form of chip are arranged on the base board 210. The square wave generator 230 is same as the square wave generator 110 of FIG. 1, and the inverter controller 240 is same as the inverter controller 120 of FIGS. 1 and 2. The square wave generator 230 is electrically connected to the first output pin of the main connecter 220 to receive the direct current voltage Vdc. The square wave generator 230 converts the direct current voltage Vdc to a first square wave voltage Vs1 to apply the first square voltage Vs1 to a first input pin of the inverter controller 240. The second output pin of the main connecter 220 is electrically connected to a second input pin of the inverter controller 240 to provide the third square wave voltage Vs3 to the second input pin when the third square wave voltage Vs3 is applied from the external device.

The inverter controller 240 receives the first square wave voltage Vs1 or the third square wave voltage Vs3 and compares a self-generated reference voltage (not shown) with the first or third square wave voltage Vs1 or Vs3 to output a second square wave voltage Vs2.

The base board 210 further includes an inverter having a bridge circuit 250, a first transformer 261, a second transformer 262 and a third transformer 263.

The bridge circuit 250 receives the second square wave voltage Vs2 and outputs first alternating current voltage Vp1, second alternating current voltage Vp2 and a third alternating current voltage Vp3, which have a predetermined frequency. The first, second and third alternating current voltage Vp1, Vp2, Vp3 have same sine waveform. The bridge circuit 250 applies the first to third alternating current voltages Vp1~Vp3 to the first to third transformers 261~263, respectively. The first to third transformers 261~263 boost the first to third alternating current voltages Vp1~Vp3 by a predetermined value and output a first lamp driving voltage $V_{L1}$, a second lamp driving voltage $V_{L2}$, a third lamp driving voltage $V_{L3}$, a fourth lamp driving voltage $V_{L4}$, a fifth lamp driving voltage $V_{L5}$ and a sixth lamp driving voltage $V_{L6}$.

The base board 210 includes the first to sixth lamp connecters 271~276. The first to sixth lamp driving voltages $V_{L1}$~$V_{L6}$ output from the first to third transformers 261~263 are applied to the first to sixth lamp connecters 271~276, respectively. The first to sixth lamp connecters 271~276 are electrically connected to both ends of a first lamp 11, a second lamp 12, a third lamp 13, a fourth lamp 14, a fifth lamp 15 and a sixth lamp 16, which are arranged outside of the inverter board 200, to apply the first to sixth lamp driving voltages $V_{L1}$~$V_{L6}$, respectively. Thus, the first to sixth lamps 11~16 may generate light in response to the first to sixth lamp driving voltages $V_{L1}$~$V_{L6}$.

As described above, since the inverter board 200 includes the square wave generator 230 mounted thereon, the direct current voltage Vdc applied from the external device is converted to the first square wave voltage Vs1 and the first square wave voltage Vs1 is applied to the inverter controller 240. Thus, the flickering phenomenon of the first to sixth lamps 11~16 due to the noise may be prevented.

Figure 6:
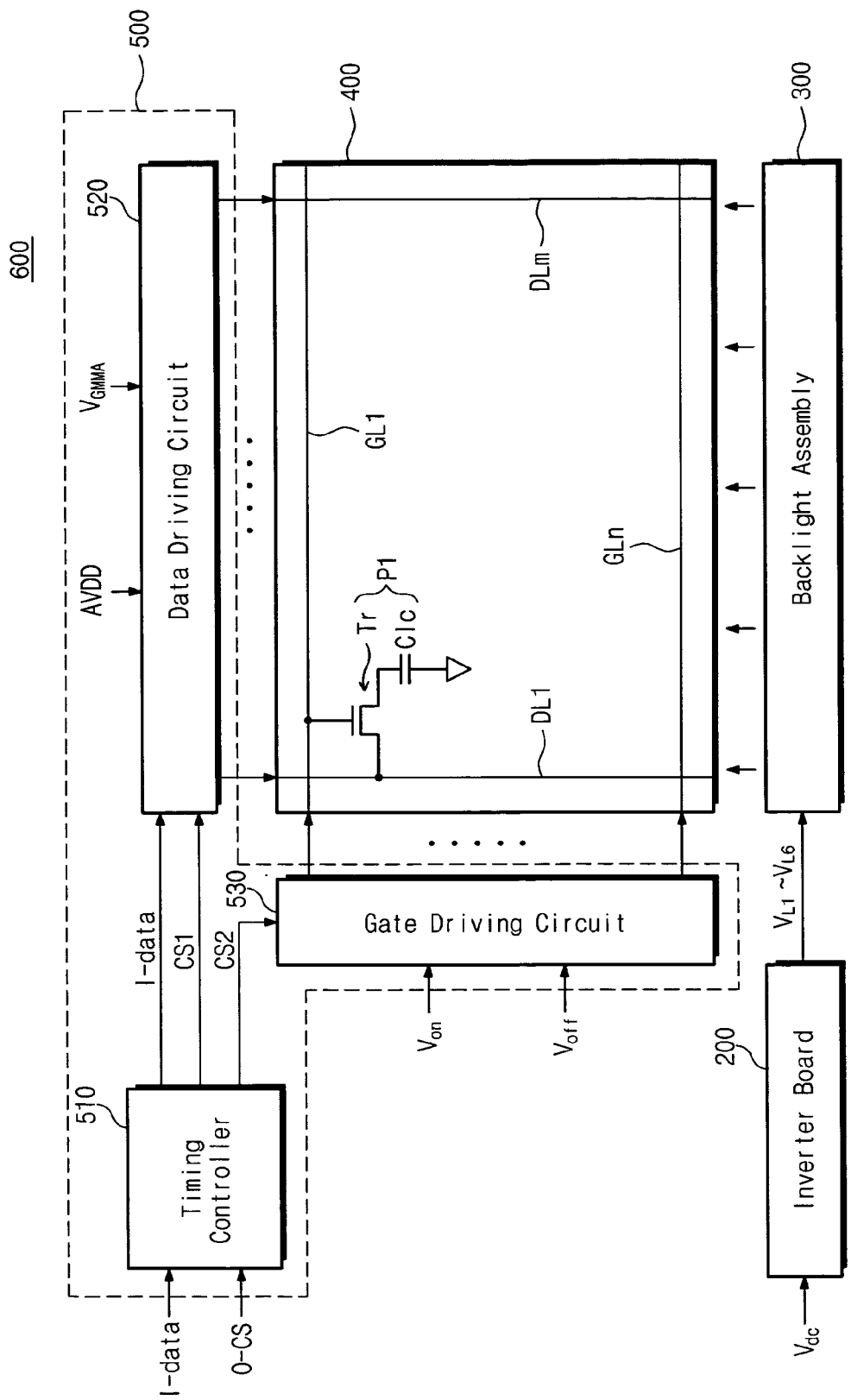
FIG. 6 is a block diagram showing a liquid crystal display having the inverter board shown in FIG. 5.

FIG. 6 is a block diagram showing a liquid crystal display using inverter board 200 shown in FIG. 5.

Referring to FIG. 6, a liquid crystal display 600 includes an inverter board 200, a backlight assembly 300, a display panel 400, and a panel driving circuit 500.

The inverter board 200 has a same configuration as inverter board shown in FIG. 5, and thus further description of the inverter board 200 is not provided. The inverter board 200 outputs the first to sixth lamp driving voltages $V_{L1}$~$V_{L6}$ in response to the direct current voltage Vdc from the external device or the third square wave voltage Vs3.

The backlight assembly 300 includes the first to sixth lamps 11~16 that generate the light. The first to sixth lamps 11~16 generate the light in response to the first to sixth lamp driving voltages $V_{L1}$~$V_{L6}$, and the generated light is applied to the display panel 400. The number of lamps arranged in the backlight assembly 300 is not limited to the present exemplary embodiment, and the backlight assembly 300 may include various numbers of lamps.

The panel driving circuit 500 includes a timing controller 510, a data driving circuit 520 and a gate driving circuit 530.

The timing controller 510 receives an image data I-data and various control signals O-CS from an external device. The timing controller 510 changes the various control signals O-CS to a data control signal CS1 and a gate control signal CS2. The data driving circuit 520 receives the image data I-data from the timing controller 510 in synchronization with the data control signal CS1. The data driving circuit 520 converts the image data I-data to a corresponding data voltage based on a gamma reference voltage $V_{GMMA}$, and outputs the converted data voltage to a plurality of data lines DL1~DLm.

The gate driving circuit 530 receives a gate-on voltage and a gate-off voltage and generates a gate signal as the gate-on voltage in response to the gate control signal CS1. The gate signal is sequentially applied to a plurality of gate lines GL1~GLn.

Display panel 400 includes an array substrate (not shown), an opposite substrate (not shown) facing the array substrate and a liquid crystal layer (not shown) interposed between the array substrate and the opposite substrate.

The array substrate includes the gate lines GL1~GLn and the data lines DL1~DLm insulating from and intersecting with the gate lines GL1~GLn arranged thereon. The array substrate includes a plurality of pixel areas defined by the gate lines GL1~GLn and the data lines DL1~DLm in a matrix configuration, and pixels are arranged in the pixel areas in one-to-one correspondence. Each of the pixels includes a thin film transistor Tr and a liquid crystal capacitor Clc.

In a first pixel P1 among the pixels, the thin film transistor Tr includes a gate electrode connected to a first gate line GL1, a source electrode connected to a first data line DL1 and a drain electrode connected to a pixel electrode that serves as a first electrode of the liquid crystal capacitor Clc. Thus, the thin film transistor Tr outputs the data voltage applied to the first data line DL1 to the pixel electrode in response to the gate signal applied to the first gate line GL1.

A common electrode is arranged overt the opposite substrate while disposing the liquid crystal layer between the array substrate and the opposite substrate. The common electrode facing the pixel electrode serves as a second electrode of the liquid crystal capacitor Clc and receives a common voltage. Since an arrangement of liquid crystal molecules disposed between the pixel electrode and the common electrode is changed by an electric field formed between the pixel electrode and the common electrode, a transmittance of a light provided from the backlight assembly 300 is controlled. Thus, images corresponding to the light may be displayed on the display panel 400.

According to the above, the direct current voltage from the external device is converted to the first square wave voltage, and the first square wave voltage is compared with the predetermined reference voltage to generate the second square wave voltage.

Thus, the turn-on and the turn-off of the lamp are controlled based on the duty ratio of the second square wave voltage, so that the flickering phenomenon caused by the noise may be prevented. As a result, the liquid crystal display may have an improved display quality.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A lamp driving circuit comprising:
   a square wave generator having an input terminal to receive a direct current voltage, and an output terminal to provide a first square wave voltage, the square wave generator being operative to provide the first square wave voltage having a duty ratio which is a function of a magnitude of the direct current voltage;
   an inverter controller having an input terminal coupled to the output terminal of the square wave generator, the inverter controller being operative to compare the first square wave voltage with a reference voltage converted from a predetermined triangle wave voltage and to provide an output terminal with a second square wave voltage which is a function of the comparison; and an inverter having an input terminal coupled to the output terminal of the inverter controller, the inverter being operative to provide a lamp driving voltage responsive to the second square wave voltage.

2. The lamp driving circuit of claim 1, wherein the square wave generator is operative to increase the duty ratio of the first square wave voltage in response to an increase of the voltage level of the direct current voltage.

3. The lamp driving circuit of claim 2, wherein the inverter controller comprises:

a first voltage generator being operative to generate the predetermined triangle wave voltage;

a converter circuit operative to convert the triangle wave voltage to the reference voltage; and a comparator receiving at a first input the first square wave voltage and at a second input the reference voltage, the comparator being operative to output the second square wave voltage based on a comparison of the first square wave voltage and the reference voltage.

4. The lamp driving circuit of claim 3, wherein the reference voltage that is output from the converter circuit has a voltage level within a swing range of the first square wave voltage.

5. The lamp driving circuit of claim 4, wherein the second square wave voltage has a same duty ratio as that of the first square wave voltage.

6. The lamp driving circuit of claim 5, wherein the lamp driving voltage is applied to the lamp during a high period of the second square wave voltage, and the lamp driving voltage is not applied to the lamp during a low period of the second square wave voltage.

7. The lamp driving circuit of claim 6, wherein the lamp driving voltage comprises an alternating current voltage.

8. The lamp driving circuit of claim 3, wherein the inverter controller comprises a first square wave input terminal connected to the square wave generator to receive the first square wave voltage.

9. The lamp driving circuit of claim 8, wherein the inverter controller comprises at least two terminals receiving the triangle wave voltage, and the converting part comprises a plurality of resistances electrically connected to the two terminals of the inverter controller.

10. The lamp driving circuit of claim 8, wherein the inverter controller further comprises a second square wave input terminal receiving a third square wave voltage having a same duty ratio as that of the first square wave voltage from the external device when the direct current voltage is not applied to the square wave generator from the external device.

* * * * *